United States Patent [19]

Nakayama et al.

[11] Patent Number: 5,062,822
[45] Date of Patent: Nov. 5, 1991

[54] DRIVE SYSTEM WITH INTERMEDIATE SHAFT FOR AUTOMOBILES

[75] Inventors: Hiroshi Nakayama; Toshiyuki Yumoto, both of Saitama, Japan

[73] Assignee: Honda Giken Kogyo Kabushiki Kaisha, Tokyo, Japan

[21] Appl. No.: 282,212

[22] Filed: Dec. 9, 1988

[30] Foreign Application Priority Data

Dec. 11, 1987 [JP] Japan .................. 62-313825

[51] Int. Cl.⁵ .............................. F16H 37/08
[52] U.S. Cl. ...................... 475/200; 475/207
[58] Field of Search ............. 74/694, 695, 700, 740; 403/326, 359; 475/200, 207, 221

[56] References Cited

U.S. PATENT DOCUMENTS

| | | | |
|---|---|---|---|
| 3,531,144 | 9/1970 | Bizilia | 403/326 |
| 3,832,076 | 8/1974 | Gehrke | 403/359 |
| 3,992,117 | 11/1976 | Ristau | 403/359 X |
| 4,056,988 | 11/1977 | Kubo et al. | 74/695 |
| 4,124,318 | 11/1978 | Sagady | 403/359 X |
| 4,193,322 | 3/1980 | Morino et al. | 74/700 |
| 4,217,794 | 8/1980 | Yasui et al. | 74/700 |
| 4,242,923 | 1/1981 | Nishikawa et al. | 74/700 |
| 4,244,242 | 1/1981 | Uno et al. | 74/694 X |
| 4,258,587 | 3/1981 | Morino | 74/695 X |
| 4,364,285 | 12/1982 | Morisawa et al. | 74/695 X |

FOREIGN PATENT DOCUMENTS

| | | |
|---|---|---|
| 0183051A1 | 6/1986 | European Pat. Off. . |
| 2805901 | 8/1978 | Fed. Rep. of Germany . |
| 2405832 | 5/1979 | France . |
| 2001593 | 2/1979 | United Kingdom . |

*Primary Examiner*—Dwight Diehl
*Attorney, Agent, or Firm*—Lyon & Lyon

[57] ABSTRACT

A drive system for an automobile comprising an engine, a transmission coupled to an output end of the engine, and a final speed reduction gear unit coupled to the lateral side of the engine.

An output shaft of the transmission and an input shaft of the final speed reduction gear unit are positioned substantially coaxially with each other and coupled to each other through an axially intermediate shaft through splines.

The intermediate shaft is axially movable with respect to output and input shafts and can be locked by a lock member in a position in which the splines of the three shafts are engaged. By releasing the lock member the intermediate shaft is movable axially until the intermediate shaft disenagages from either the output shaft or the input shaft. For allowing separate removal of the transmission or the final speed reduction gear unit from the engine.

16 Claims, 7 Drawing Sheets

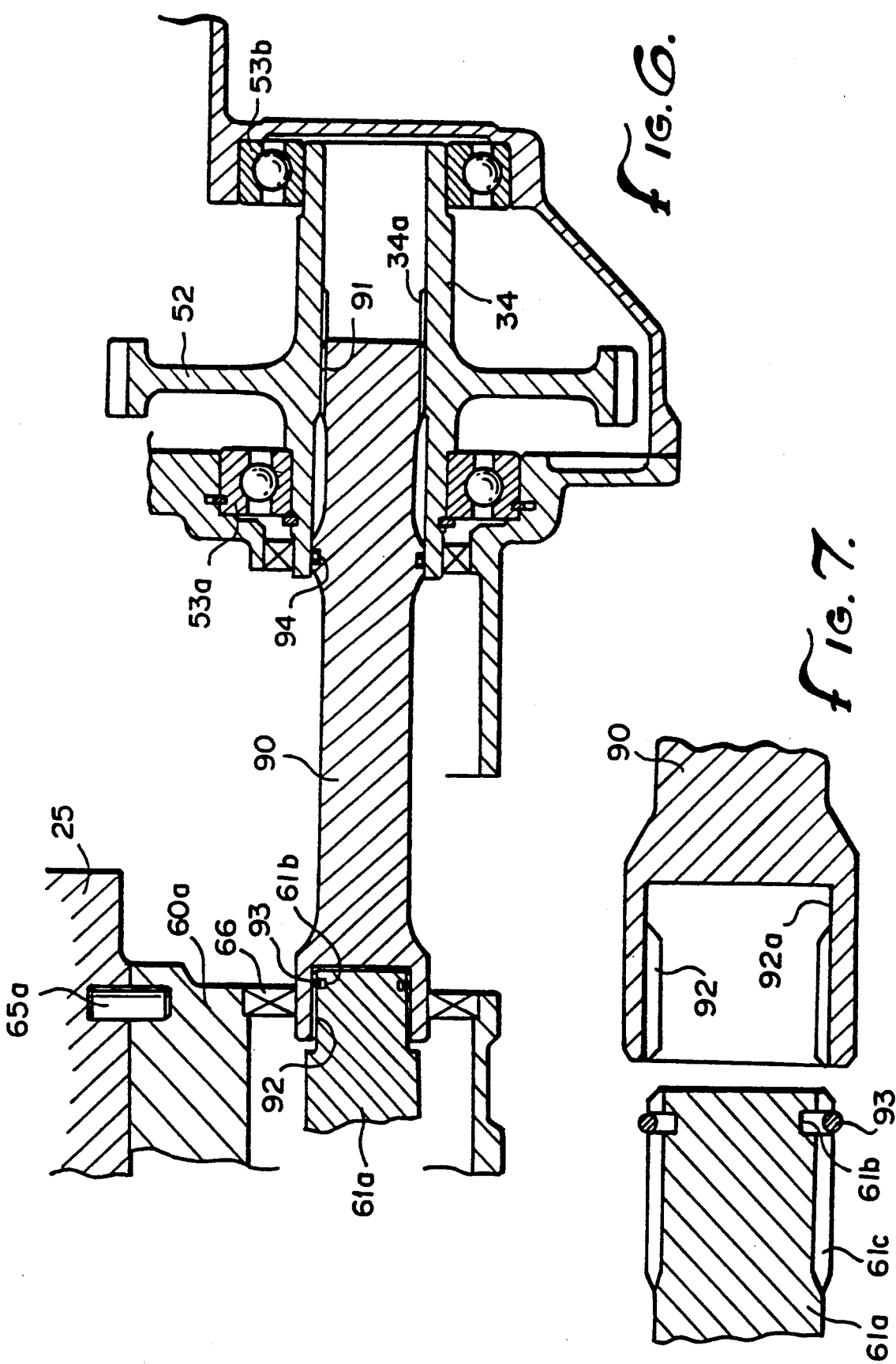

DRIVE SYSTEM WITH INTERMEDIATE SHAFT FOR AUTOMOBILES

The present invention relates to a drive system for an automobile and, in particular, a front-engine and front wheel drive type system which couples an engine and a transmission to each other and couples a final speed reduction gear unit to the engine.

For purposes of making a drive system compact in an automobile, some front-engine and front-drive (FF) automobiles include, as shown in FIGS. 9A and 9B of the accompanying drawings, a gear transmission comprising a torque converter (or clutch) 2 and a transmission mechanism 3 with a final speed reduction gear unit 4 disposed therebetween. With the illustrated arrangement, the engine 1 overhangs forwardly of the pair of laterally spaced road wheels 5 disposed on the opposite sides of the final reduction gear unit 4. Therefore, the automobile is heavier at its front portion than at its rear portion, i.e., the weight of the automobile is not uniformly distributed in its longitudinal direction. Since the road wheels 5 are positioned to the rear of the engine compartment of the automobile, the passenger compartment is reduced in size, particularly the foot space in front of the front seats.

Japanese Patent Publication No. 58-24289 discloses, as shown in FIG. 10 of the accompanying drawings, another conventional arrangement with a final speed reduction gear unit 4 disposed directly underneath the engine 1. In order to make the passenger compartment as large as possible, the transmission 7 is located below the output shaft of the engine 1 and the output of a torque converter 6 and the input shaft of the transmission 7 are operatively coupled to each other by sprockets 8a, 8b and a chain 8c trained therearound. In the illustrated structure, the final reduction gear unit 4 is integrally joined to the transmission. However, the final reduction gear unit may be integrally joined to the engine downwardly thereof, and may be operatively coupled to the transmission by an intermediate shaft. The layout disclosed in FIG. 10 reduces the forward overhang of the engine 1, thereby providing a larger passenger compartment space. However, inasmuch as the final reduction gear unit 4 is positioned beneath the engine 1, the top of the engine 1 is relatively high with respect to the automobile body and therefore so is the engine hood. The driver of the automobile has limited visibility in the forward-downward direction and the automobile is less stable because the center of gravity of the engine 1 is higher. It is therefore desirable to locate the final reduction gear unit laterally of the engine.

When the transmission is joined to the output end of the engine and the final reduction gear unit is joined to the side of the engine laterally or downwardly thereof, with the transmission output shaft and the final reduction gear unit input shaft being coupled to each other through an intermediate shaft, thereby providing a drive system, there are certain disadvantages in and limitations on the process of assembling and disassembling the drive system. For example, when joining the final reduction gear unit to the engine laterally thereof, it is the normal practice to employ a positioning pin across the joining surfaces of the final reduction gear unit and the engine to position them with respect to each other. To detach the final reduction gear unit from the engine, it is necessary to remove the final reduction gear unit in a direction normal to the axial direction of the intermediate shaft. Therefore, the final reduction gear unit cannot be dismounted unless the intermediate shaft is removed. To remove the intermediate shaft, however, the transmission must be detached from the engine at first. Consequently, the transmission must first be dismounted in order to disassemble the final reduction gear unit. The disassembling and assembling procedure is therefore complex and expensive.

In view of the aforesaid problems, it is an object of the present invention to provide a drive system which allows a transmission and a final speed reduction gear unit which are interconnected by an intermediate shaft, to be disconnected while the transmission and the final reduction gear unit are being joined to the engine.

To achieve the above object, the drive system according to the present invention includes a lock member for locking an intermediate shaft in a position to engage and interconnect an output shaft of a transmission and an input shaft of a final speed reduction gear unit. The intermediate shaft can be disengaged from at least one of the transmission output shaft or the final speed reduction gear unit input shaft by releasing the intermediate shaft from the lock member and moving the intermediate shaft in an axial direction.

For dismounting the transmission and the final reduction gear unit from the engine, the intermediate shaft is unlocked from the lock member so as to be axially movable, and then is moved axially to disengage from the output shaft of the transmission or the input shaft of the final reduction gear unit. With the intermediate shaft disengaged from the transmission or the final reduction gear unit, the transmission and the final reduction gear unit can independently be disassembled or assembled, and hence the disassembling and assembling process is greatly simplified.

Preferred embodiments of the present invention will hereinafter be described with reference to the drawings, wherein:

FIG. 6 is an enlarged fragmentary cross-sectional view of a portion of FIG. 4 showing a joint structure including an intermediate shaft in the drive system;

FIG. 7 is a further enlarged fragmentary cross-sectional view of a portion of the joint structure shown in FIG. 6;

Figure 1:
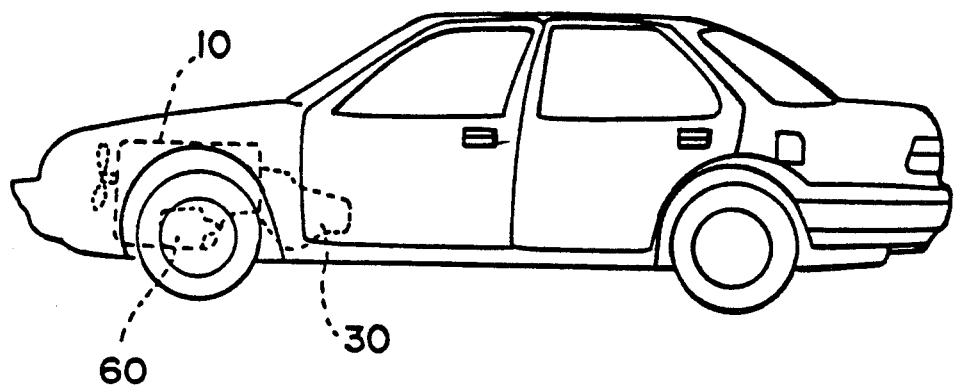
FIG. 1 is a side elevational view of an automobile including a drive system according to the present invention.
Figure 2:
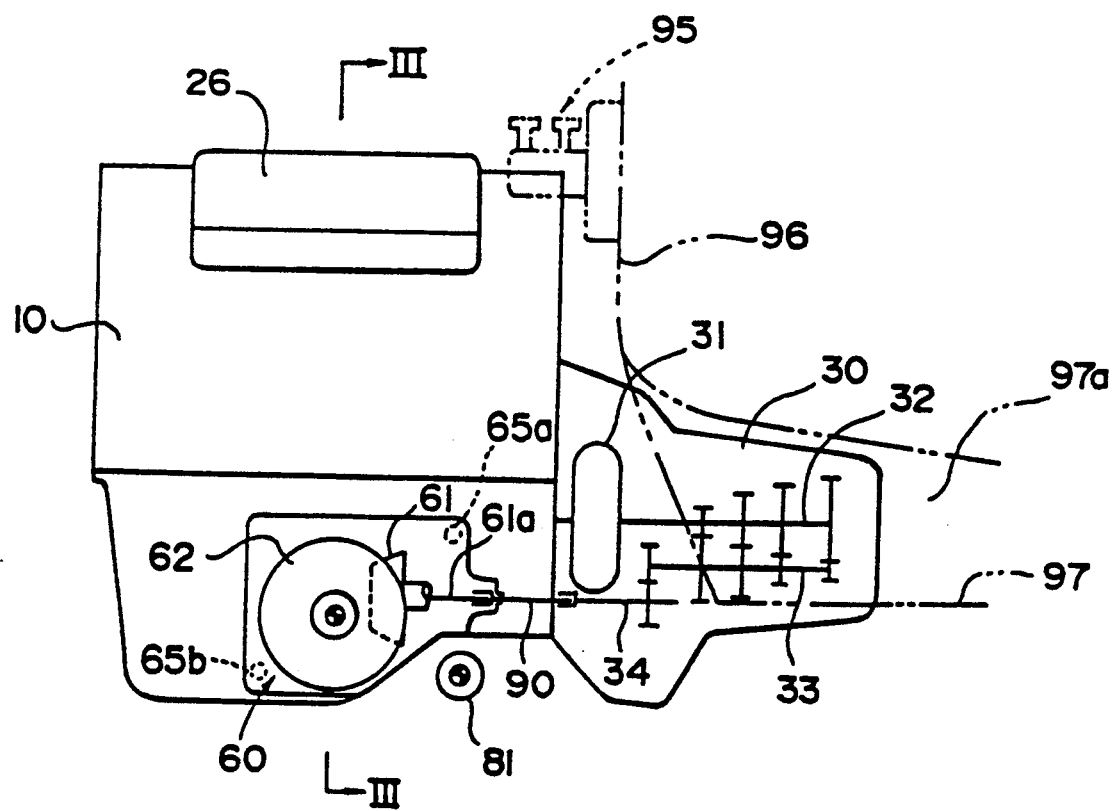
FIG. 2 is a schematic side elevational view of the drive system.

FIG. 1 is a side elevational view showing an automobile equipped with a drive system according to the present invention. The drive system is installed in the front portion of the automobile and comprises an engine 10, a transmission 30, and a final speed reduction gear unit 60. The drive system is schematically shown in FIG. 2. The engine 10 has a crankshaft extending longitudinally of the automobile and has the rear end coupled to the transmission 30. The final reduction gear unit 60 is joined to the lefthand side of the engine 10. The output shaft of the engine 10 is connected coaxially to an input shaft 32 of the transmission 30 through a torque converter 31. The transmission 30 includes a countershaft-type transmission mechanism disposed between the input shaft 32 and a countershaft 33 extending parallel to the input shaft 32. The counter shaft 33 is operatively coupled to a output shaft 34 through an output gear train.

The final reduction gear unit 60 has a speed reducer gear train comprising a hypoid gear train, comprising a final driver pinion 61 and a final ring gear 62, and a differential gear train. These two gear trains are disposed in a case 60a having a cover 60b. The final reduction gear unit 60 on the lefthand side of the engine 10 is separate from the transmission 30. To position the final reduction gear unit 60 with respect to the engine 10, two positioning pins 65a and 65b extend across the joining surfaces of and into holes in the final reduction gear unit case 60a and an oil pan 25. The transmission output shaft 34 is located substantially coaxially with an input shaft (i.e., the shaft of the final driver pinion) 61a of the final reduction gear unit 60 and coupled thereto through an intermediate shaft 90.

An engine compartment and a passenger compartment of the automobile are separated from each other by a dashboard panel 96 and a floor panel 97 having a tunnel 97a. The engine 10, the transmission 30, and the final reduction gear unit 60 are disposed in the engine compartment, with the transmission 30 partly projecting into a lower portion of the passenger compartment. Since the final reduction gear unit 60 is mounted on the side of the engine 10, the engine 10 is very low in position with respect to the body of the automobile. Therefore, the transmission 30 is also positioned low and disposed in the tunnel 97a formed in the floor panel 97 in the longitudinal direction of the automobile body. The extent to which the transmission 30 projects into the passenger compartment is relatively small, thus making a large passenger compartment space available. Since the engine hood may also be lowered by lowering the engine 10, the forward view from the driver's seat is improved.

Since the transmission 30 and the final reduction gear unit 60 are disposed separately from each other and operatively coupled to each other through the intermediate shaft 90, a space is provided below the intermediate shaft 90. Therefore, tie rod 81 of the steering mechanism can be disposed in such a space, and hence the tie rod 81 can be disposed rearwardly of the final reduction gear unit 60 an the axle shafts extending laterally therefrom, without lowering the minimum height of the tie rod, and thus the automobile, from ground.

Figure 3:
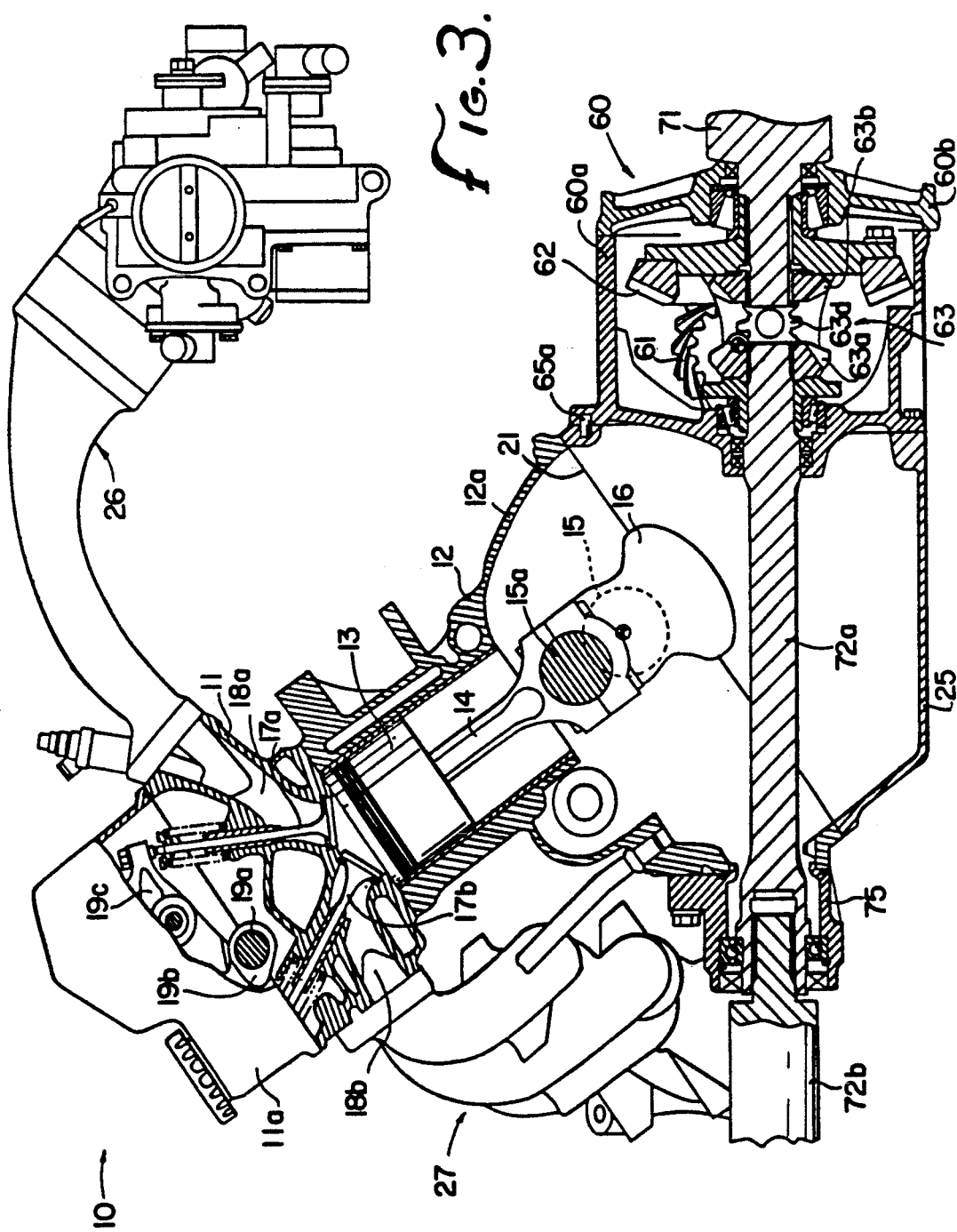
FIG. 3 is an enlarged cross-sectional view taken along line III—III of FIG. 2.

The drive system will be described in greater detail with reference to FIGS. 3 and 4. The engine 10 is an in-line multicylinder engine having a plurality of cylinders, the axes of which are inclined to the left (to the righthand side of the automobile body) from the vertical as viewed from the front of the automobile as shown in FIG. 3. With the cylinder axes thus inclined, the height of the entire engine 10 is reduced and the engine hood may be lowered. The engine 10 has an engine case comprising a cylinder block 12 in which pistons 13 are slidably accommodated for reciprocating sliding movement along the cylinder axes, a cylinder head 11 coupled to the upper surface of the cylinder block 12 and having intake and exhaust passages 18a, 18b and intake and exhaust valves 17a, 17b for opening and closing the intake and exhaust passages 18a, 18b, respectively, and an oil pan 25 coupled to the lower surface of the cylinder block 12.

The intake passages 18a are open at the side surface of the cylinder head 11 which faces away from the direction in which the cylinder axes are inclined. The open ends of the intake passages 18a are connected to an intake manifold 26. The exhaust passages 18b are open at the opposite side surface of the cylinder head 11 which faces in the direction in which the cylinder axes are inclined. An exhaust manifold 27 connected to the open ends of the exhaust passages 18b is mounted on the engine case. With this arrangement, the intake manifold 26 is disposed in a large space on the side of the cylinder head 11 which faces away from the direction in which the cylinder axes are inclined. It is therefore easy to increase the length of intake pipes for an increased intake air inertia effect to increase the performance of the engine.

A camshaft 19a having a plurality of cams 19b thereon arranged therealong is rotatably mounted on an upper end of the cylinder head 11. The camshaft 19a extends along the cylinder bank, i.e., in the longitudinal direction of the automobile. Upon rotation of the camshaft 19a in synchronism with engine rotation, the cams 19b cause rocker arms 19c to open and close the intake valves 17a and other rocker arms (not shown) to open and close the exhaust valves 17b. The camshaft 19a and the rocker arms 19c are covered with a head cover 11a mounted on the upper surface of the cylinder head 11.

The cylinder block 12 includes a lower crankcase 12a in which a crankshaft 15 extends longitudinally and is rotatably mounted. The crankshaft 15 includes a plurality of cranks 15a on which there are rotatably mounted connecting rods 14 having upper ends coupled to the respective pistons 13. The crankshaft 15 is rotated about its own axis through the connecting rods 14 and the cranks 15a in response to reciprocating movement of the pistons 13. Counterweights 16 are mounted on the crankshaft 15 and project away from the cranks 15a.

The oil pan 25 is joined to the lower surface 21 of the crankcase 12a of the cylinder block 12. The oil pan 25 and the case 60a of the final reduction gear unit 60 are fastened to each other by means of bolts or the like. As described above, the two positioning pins 65a, 65b (the pin 65b is not shown in FIG. 3) are provided for positioning the engine 10 and the final reduction gear unit 60 with respect to each other (the final reduction gear unit 10 and the axle shafts coupled thereto will be described below).

Figure 4:
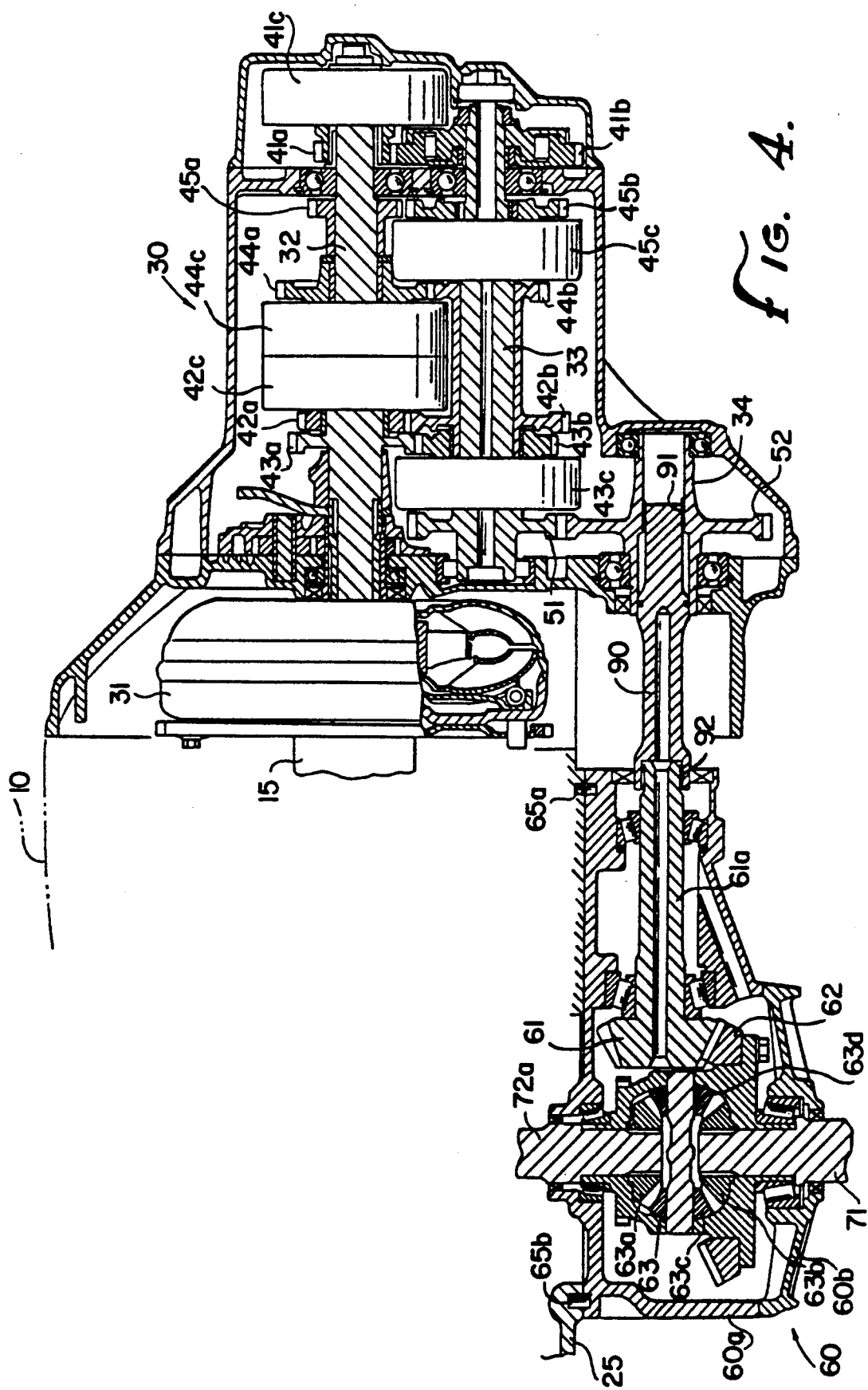
FIG. 4 is an enlarged cross-sectional view of the drive system taken along the shafts of the transmission.

As shown in FIG. 4, the transmission 30 is connected to the rear end of the engine 10 and the illustrated transmission 30 is an automatic transmission although it will readily appear to those skilled in the art that it may be a manual shift type transmission without departing from this invention. The torque converter 31 (which would be a clutch with a manual transmission) is coupled to the output shaft or crankshaft 15 of the engine 10 and has an output shaft serving as the transmission input shaft 32. Between the transmission input shaft 32 and the transmission countershaft 33, there are disposed five gear trains, i.e., a first gear position gear train comprising intermeshing gears 41a, 41b, a second gear position gear train comprising intermeshing gears 42a, 42b, a third gear position gear train comprising intermeshing gears 43a, 43b, a fourth gear position gear train comprising intermeshing gears 44a, 44b, and a reverse gear position gear train comprising intermeshing gears 45a, 45b and a reverse idler gear (not shown). These gear trains are associated with respective hydraulically operated clutches 41c, 42c, 43c, 44c, 45c for transmitting engine power through the gear trains. By selectively operating these clutches 41c, 42c, 43c, 44c, 45c, one of the five gear trains is selected to transmit engine power in the corresponding gear position.

Figure 10:
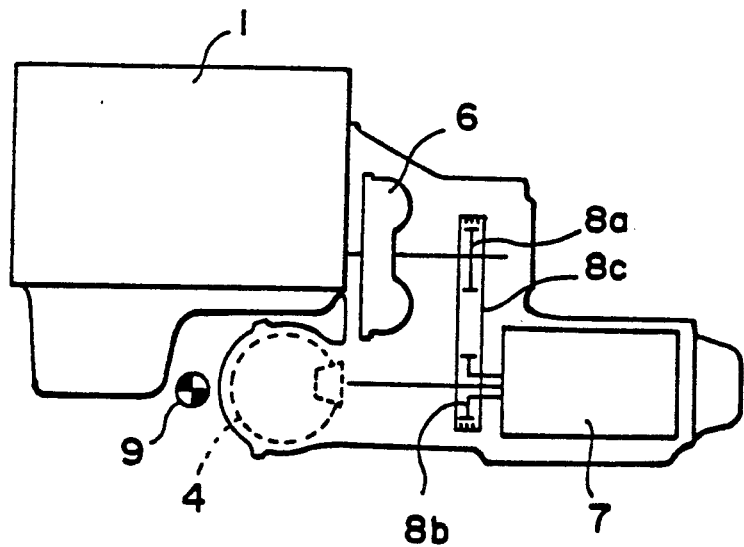
FIG. 10 is an elevation view showing another conventional drive system.

Since the position of the engine 10 with respect to the automobile body is low, the transmission 30 is disposed in the floor tunnel 97a as shown in FIG. 2 even though the input shaft 32 is disposed coaxially with the engine crankshaft 15 and the transmission mechanism is disposed between the input shaft 32 and the countershaft 33. Therefore, no conventional mechanism (such as the chain 8c in FIG. 10) for transmitting engine output power from the crankshaft to the transmission mechanism is disposed below the crankshaft since it is not necessary and therefore the transmission is structurally simpler.

The transmission countershaft 33 and the transmission output shaft 34 parallel thereto are operatively coupled to each other through an output gear train comprising intermeshing gears 51, 52, formed or mounted on shafts 33, 34, respectively. The engine output power transmitted through one of the five transmission gear trains which is selected by the corresponding hydraulically operated clutch is transmitted from the countershaft 33 to the output shaft 34. The output shaft 34 is positioned substantially coaxially with the input shaft of the final reduction gear unit 60, i.e., the shaft 61a of the final driver pinion 61, and coupled thereto through the intermediate shaft 90 which has splines 91, 92 on its opposite ends.

The hypoid gear train comprising the final driver pinion 61 and the final ring gear 62, and the differential gear train 63 comprising four bevel gears 63a, 63b, 63c and 63d are disposed in a space defined in and between the case 60a and the cover 60b. The bevel gears 63c, 63d are rotatably supported by the final ring gear 62, and the bevel gears 63a, 63b are coupled respectively to axle shafts 71, 72 (axle shaft 72 being comprised of shafts 72a and 72b). Therefore, the engine power transmitted to the transmission output shaft 34 is reduced in rotational speed by the hypoid gear train, and split and transmitted to the axle shafts 71, 72 through the differential gear train 63 to drive transversely spaced front road wheels coupled respectively to the axle shafts 71, 72.

The axle shaft 71 extends away from the direction in which the engine 10 is inclined, and is coupled to the lefthand front road wheel. The axle shaft 72 extends in the direction in which the engine 20 is inclined and is connected to the righthand front road wheel. The axle shaft 72 comprises a first shaft 72a extending through the engine case (i.e., the oil pan 25 and the crankcase 12a) that is rotatably supported in a shaft support member 75 attached to the side of the crankcase 12a remote from the final reduction gear unit 60, and a second shaft 72b coupled to the end of the first shaft 72a in the shaft support member 75.

Figure 5:
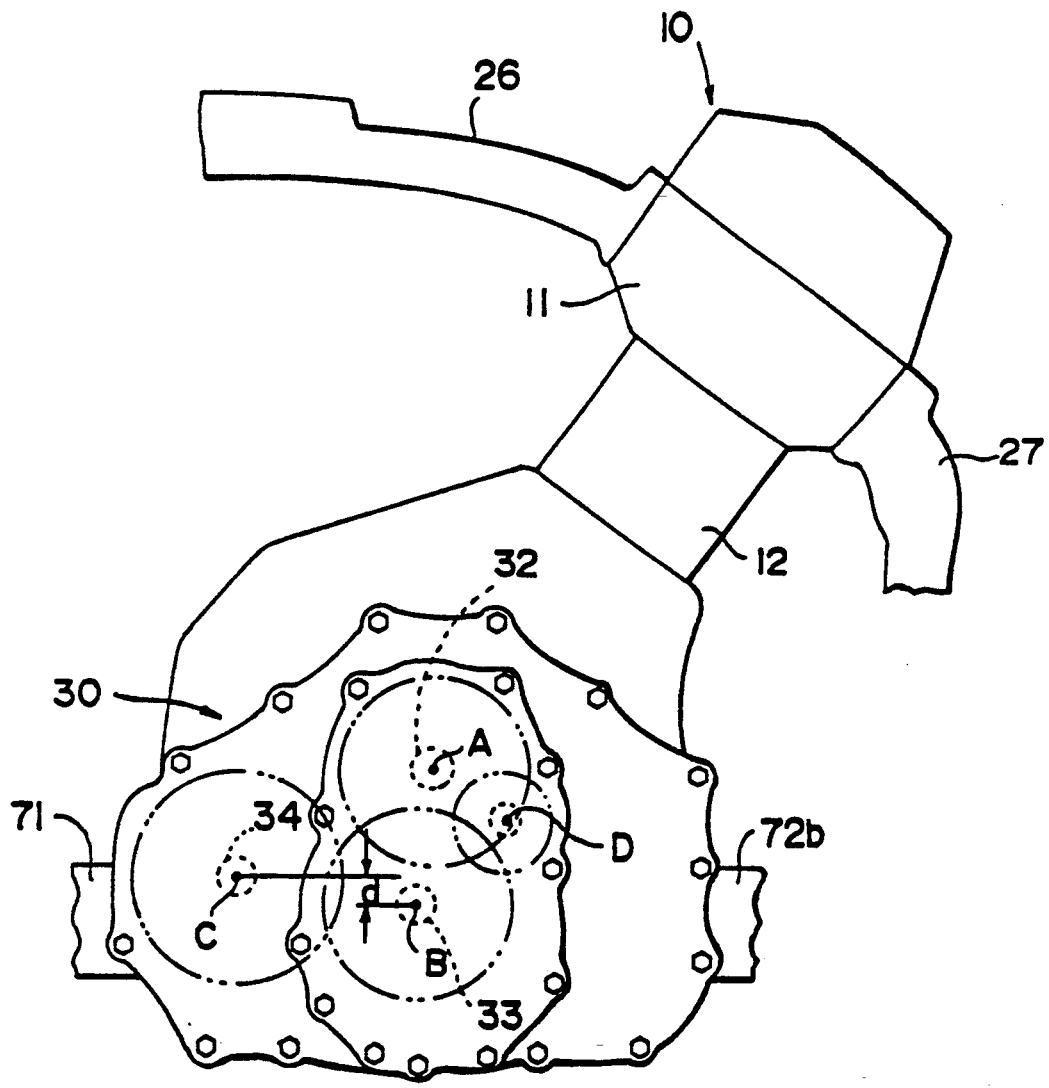
FIG. 5 is a rear elevational view of the drive system.

The drive system of the above construction is viewed from behind in FIG. 5. The crankshaft 15 of the engine 10 and the input shaft 32 of the transmission 30 have their central axes positioned along an axial line normal to the sheet of FIG. 5, indicated at A. The transmission countershaft 33 has a central axis B positioned substantially vertically below the central axes A of the transmission input shaft 32. The transmission output shaft 34 has a central axis C positioned laterally of the countershaft 33 and displaced upwardly from the countershaft 33 by a distance d. The reverse idler gear has its central axis located at D.

With the shafts thus arranged, the transmission 30 is of a reduced height and made compact. Even when the transmission input shaft 32 is disposed coaxially with the crankshaft 15 and the position of the engine 10 with respect to the automobile body is lowered, since the output shaft 34 of the transmission 30 is displaced by the distance d upwardly from the transmission countershaft 33, the lower surface of the transmission 30 can lie flush with or be positioned upwardly of the lower surface of the engine 10. Therefore, a desired minimum height of the automobile from the ground can easily be achieved. Inasmuch as the transmission output shaft 34 is located alongside of the transmission countershaft 33 and the transmission input shaft 32, the final driver pinion shaft 61a of the final reduction gear unit 60 is disposed laterally of the engine 10 and coaxially with and coupled the transmission output shaft 34 without undue limitations.

FIGS. 6 and 7 show in cross section a joint structure by which the output shaft 34 of the transmission 30 and the final driver pinion shaft 61a of the final reduction gear unit 60 are coupled to each other through the intermediate shaft 90 in the drive system of the above arrangement. The transmission output shaft 34 is integrally formed with the output gear 52 and rotatably supported by a pair of ball bearings 53a, 53b. The transmission output shaft 34 has internal splines 34a in its bore. The final driver pinion shaft 61a has external splines 61c (FIG. 7) on its end portion and a radial annular clip ring groove 61b defined near the end thereof. A clip ring 93 is disposed in the clip ring groove 61b, as shown in FIG. 7.

The intermediate shaft 90 has external splines 91 on its righthand end portion which are held in mesh with the internal splines 34a in the output shaft 34, and internal splines 92 in its lefthand end portion which are held in mesh with the external splines 61c of the final driver pinion shaft 61. As shown in FIG. 6, the intermediate shaft 90 axially interconnects the output shaft 34 and the final driver pinion shaft 61a through the splines 91, 92 meshing with the companion splines 34a, 61c, respectively.

If the shafts were interconnected by only the meshing engagement of these splines, the intermediate shaft 90 would be axially slidable freely and might move to the right until the splines 92 and the splines 61c would become disengaged and out of mesh with each other. To avoid this, as shown in FIG. 7, an annular groove 92a is defined at the inner ends of the internal splines 92 in the intermediate shaft 90. When the external splines 61c of the final driver pinion shaft 61a are moved into mesh with the internal splines 92, the clip ring 93 is fully compressed into the clip ring groove 61b by the radially inner surfaces of the internal splines 92 and when the splines 92, 61c are in complete mesh with each other, the clip ring 93 expands radially outwardly into the groove 92a. The intermediate shaft 90 is therefore locked in the position shown in FIG. 6. The clip ring 93 thus serves as a lock means.

The clip ring 93 expands radially under its own spring forces for locking the shafts 61a, 90 together. Thus, the intermediate shaft 90 can be unlocked or released from the final driver pinion shaft 61a by forcibly pushing the intermediate shaft 90 to the right. Since the positioning pins 65a, 65b are fitted across the joining surfaces of the engine 10 and the final reduction gear unit 60, it would be impossible to move the final reduction gear unit 60 in the axial direction of the intermediate shaft 90. Also, it would be impossible to move the final reduction gear unit 60 in a direction normal to the axis of the intermediate shaft 90 for disengaging the positioning pins 65a, 65b because the intermediate shaft 90 is in the way. Consequently, the final reduction gear unit 60 could not be detached. However, by forcibly pushing the intermediate shaft 90 to the right, the intermediate shaft 90 is unlocked from the clip ring 93. The intermediate shaft 90 is subsequently moved to the right until the splines 92, 61c are disengaged from each other. Thus, the intermediate shaft 90 is removed from the final reduction gear unit 60, which can thereafter be dismounted from the engine 10. The illustrated structure of the drive system thus permits the transmission 30 and the final reduction gear unit 60 to be independently attached to and detached from the engine 10.

Figure 8:
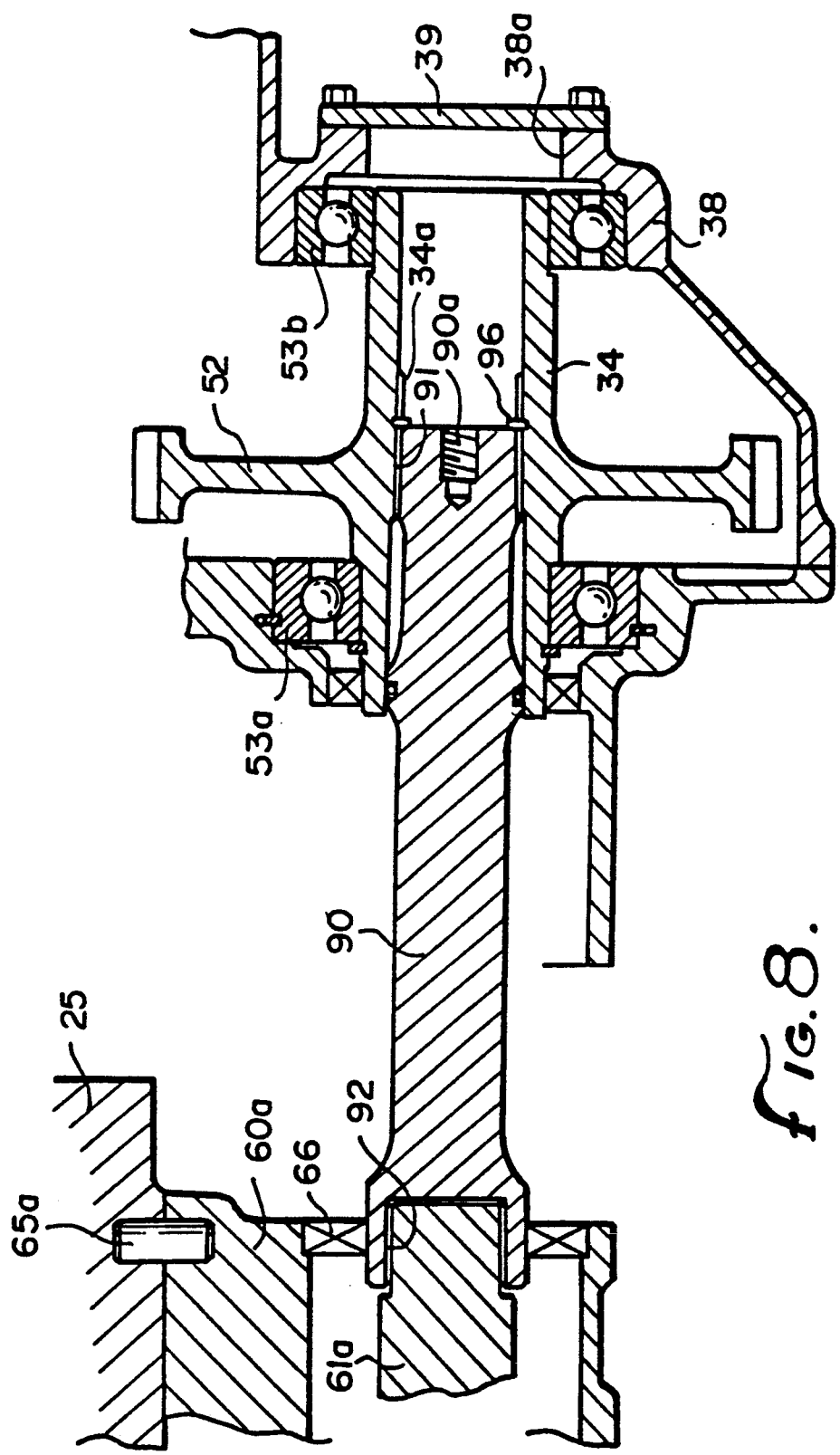
FIG. 8 is a fragmentary cross-sectional view similar to FIG. 6 showing a joint structure including an intermediate shaft in a drive system according to another embodiment of the present invention.
Figure 9A:
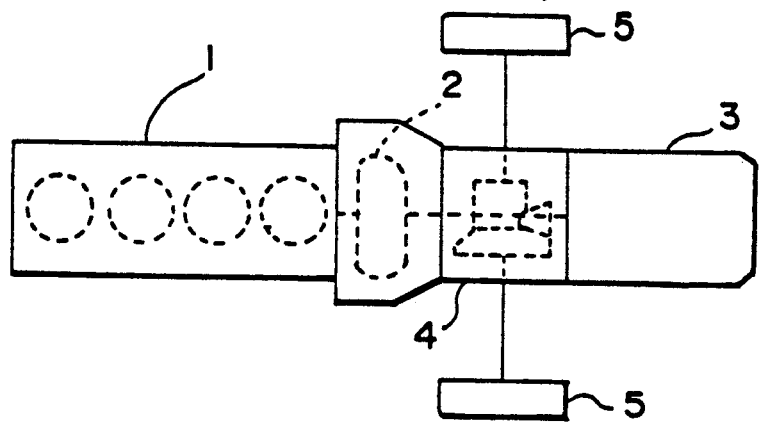
FIGS. 9A and 9B are plan and elevation views, respectively, showing a conventional drive system.
Figure 9B:
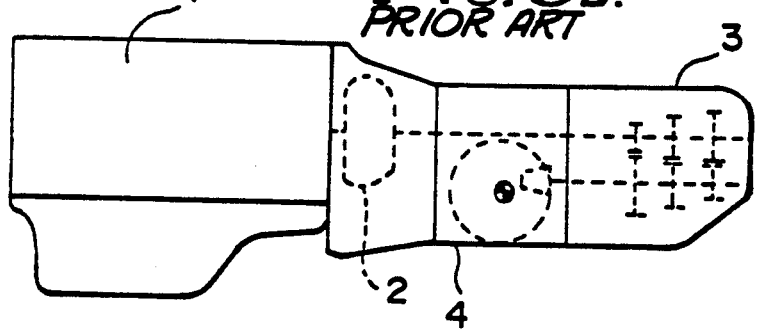

FIG. 8 shows in cross section an alternate structure for locking the intermediate shaft 90 in position. The end portion of the final driver pinion 61a has external splines 61c but has no clip ring groove. A circlip ring or retainer ring 96 is disposed as a lock means on the internal splines 34a in the bore of the transmission output shaft 34 for limiting rightward movement of the intermediate shaft 90 and holding the intermediate shaft 90 in engagement with both the transmission output shaft 34 and the final driver pinion shaft (i.e., the input shaft of the final reduction gear unit) 61a to interconnect them.

The transmission case has an opening 38a defined in a portion 38 thereof which confronts the righthand end of the output shaft 34, and the opening 38a is covered with a cover 39. By detaching the cover 39 and removing the circlip ring 96 with a circlip tool or the like inserted through the opening 38a, the intermediate shaft 90 can be moved to the right. The intermediate shaft 90 can be axially pulled out of engagement with the final driver pinion 61a by a puller (not shown) having a distal end threaded to threadly engage an internally threaded hole 90a defined in the righthand end of the intermediate shaft 90.

In the illustrated embodiments, the engine has its crankshaft oriented longitudinally with respect to the automobile. However, the present invention is also applicable to a drive system having an engine with its crankshaft oriented transversely with respect to the automobile. Also, the final speed reduction gear unit may be joined to the engine downwardly thereof without departing from this invention. While in the shown embodiments the intermediate shaft is moved to the right out of engagement with the final reduction gear unit, the drive system may be arranged such that the intermediate shaft can be disconnected from the final reduction gear unit or the transmission by being moved to the left.

With the present invention, as described above, the intermediate shaft for interconnecting the transmission output shaft and the input shaft of the final speed reduction gear unit can be locked by a lock member in a position to engage the output and input shafts and connect them to each other. By unlocking the intermediate shaft from the lock member, the intermediate shaft can be moved in an axial direction out of engagement with at least one of the output and input shafts. For dismounting the transmission and the final reduction gear unit from the engine, the intermediate shaft is unlocked from the lock member so as to be movable in the axial direction, and is moved in the axial direction out of engagement with the output shaft of the transmission or the input shaft of the final reduction gear unit. With the intermediate shaft released from the transmission or the final reduction gear unit, the transmission and the final reduction gear unit can independently be disassembled and assembled from the engine. The process of disassembling and assembling the transmission and the final reduction gear unit can be readily accomplished.

We claim:

1. A drive system for an automobile comprising an engine, a transmission coupled to an output end of the engine, and a final speed reduction gear unit joined to said engine either laterally or downwardly thereof separately from said transmission, comprising, an output shaft of said transmission and an input shaft of said final speed reduction gear unit positioned substantially coaxially with each other and coupled to each other through an intermediate shaft having a solid portion coaxial with and between said input and output shaft, said intermediate shaft being axially movable with respect to said output shaft and said input shaft, and a lock member for locking said intermediate shaft in a position engaging said output and input shafts to connect them, and said intermediate shaft being releasable from said lock member and movable axially until the intermediate shaft disengages from at least one of said output and input shafts.

2. The drive system of claim 1, wherein the lock member comprises a split ring, said intermediate shaft and at least one of said output and input shafts having means for mating engagement with said split ring for causing said locking, wherein said intermediate shaft extends into a space axially in between said output and input shafts.

3. The drive system of claim 2, wherein said means for mating engagement include an annular groove in at least one of said output and input shafts in which said split ring is positioned.

4. The drive system of claim 3, wherein said groove is provided near the end of the final speed reduction gear unit input shaft, and the split ring resiliently engages a second groove in the intermediate shaft.

5. The drive system of claim 4, wherein a spline connection is provided between said input shaft and said intermediate shaft, and said annual groove in said input shaft is in a portion of said spline.

6. The drive system of claim 3, wherein said annular groove is located in said transmission output shaft and said split ring engages and end of the intermediate shaft.

7. The drive system of claim 1, wherein said engine has cylinder axes inclined from a vertical plane and said final speed reduction gear unit is joined to a lateral side of said engine which faces away from the direction in which said cylinder axes are inclined.

8. A drive system for an automobile comprising an engine, a transmission coupled to an output end of the engine, and a final speed reduction gear unit joined to said engine either laterally or downwardly thereof separately from said transmission, comprising, an output shaft of said transmission and an input shaft of said final speed reduction gear unit positioned substantially coaxially with each other and coupled to each other through an intermediate shaft, said intermediate shaft being axially movable with respect to said output shaft and said input shaft, and a lock member for locking said intermediate shaft in a position engaging said output and input shafts to connect them, and said intermediate shaft being releasable from said lock member and movable axially until the intermediate shaft disengages from at least one of said output and input shafts, wherein the lock member comprises a split ring, said intermediate shaft and at least one of said output and input shafts having means for mating engagement with said split ring for causing said locking, wherein said intermediate shaft extends into a space axially in between said output and input shafts, wherein said split ring is resiliently collapsible for releasing said split ring from said mating engagement, and wherein at least one of said transmission and said final speed reduction gear unit is movable in an axial direction of said intermediate shaft toward another of said transmission and said final speed reduction gear unit only upon said releasing and disengagement of said intermediate shaft from said at least one of said output and input shafts.

9. A drive system for an automobile comprising an engine, a transmission coupled to an output end of the engine, and a final speed reduction gear unit joined to said engine either laterally or downwardly thereof separately from said transmission, comprising, an output shaft of said transmission and an input shaft of said final speed reduction gear unit positioned substantially coaxially with each other and coupled to each other through an intermediate shaft, said intermediate shaft being axially movable with respect to said output shaft and said input shaft, and a lock member for locking said intermediate shaft in a position engaging said output and input shafts to connect them, and said intermediate shaft being releasable from said lock member and movable axially until the intermediate shaft disengages from at least one of said output and input shafts;
   said lock member comprising a split ring, said intermediate shaft and said transmission output shaft having means for mating engagement with said split ring for causing said locking including an annular groove in said output shaft in which said split ring is positioned with said split ring engaging an end of the intermediate shaft; and
   wherein the transmission is provided with a hole in alignment with said output shaft for access to said split ring for releasing same, and a removable cover for said hole.

10. The drive system of claim 9 further comprising an internally threaded hole in said end of the intermediate shaft.

11. A drive system for an automobile comprising an engine, a transmission coupled to an output end of the engine, and a final speed reduction gear unit joined to said engine either laterally or downwardly thereof separately from said transmission, comprising, an output shaft of said transmission and an input shaft of said final speed reduction gear unit positioned substantially coaxially with each other and coupled to each other through an intermediate shaft, said intermediate shaft being axially movable with respect to said output shaft and said input shaft, and a lock member for locking said intermediate shaft in a position engaging said output and input shafts to connect them, and said intermediate shaft being releasable from said lock member and movable axially until the intermediate shaft disengages from at least one of said output and input shafts, wherein said transmission output shaft is tubular with an internal spline, said intermediate shaft has an external spline on one end for meshing engagement with the output shaft spline, and said intermediate shaft being axially slidable within said tubular output shaft for disengagement from said input shaft, said disengagement permitting each of said output and input shafts to be axially movable toward each other.

12. A drive system for an automobile comprising an engine, a transmission coupled to an output end of the engine, and a final speed reduction gear unit joined to a lateral side of said engine separately from said transmission, comprising, an output shaft of said transmission and an input shaft of said final speed reduction gear unit positioned substantially coaxially with each other, an intermediate shaft positioned in axial alignment with and having a solid portion coaxially extending in between said input and output shafts, spline means on each end of said intermediate shaft for meshing with mating spline means on said output and input shafts for coupling all three shafts together in driving relationship, said intermediate shaft being axially movable with respect to said output shaft and said input shaft, split ring lock member for engaging means on one of said output and input shafts for locking said intermediate shaft in a position in which the splines on said intermediate shaft engage the splines on said output and input shafts for said coupling and said intermediate shaft being releasable from said split ring lock member and movable axially until at least one of the splines on said intermediate shaft disengages from the spline on at least one of said output and input shafts.

13. A drive system for an automobile comprising an engine, a transmission coupled to an output end of the engine, and a final speed reduction gear unit joined to a lateral side of said engine separately from said transmission, comprising, an output shaft of said transmission and an input shaft of said final speed reduction gear unit positioned substantially coaxially with each other, an intermediate shaft positioned in axial alignment with and extending in between said input and output shafts, spline means on each end of said intermediate shaft for meshing with mating spline means of said output and input shafts for coupling all three shafts together in driving relationship, said intermediate shaft being axially moveable with respect to said output shaft and said input shaft, split ring lock member for engaging means on one of said output and input shafts for locking said intermediate shaft in a position in which the splines on said intermediate shaft engage the splines on said output and input shafts for said coupling and said intermediate shaft is capable of releasing from said split ring lock member and moving axially until at least one of the splines on said intermediate shaft disengages from the spline on at least one of said output and input shafts, wherein a cross-sectionally solid portion of said intermediate shaft prevents one of said output and input shafts from being axially movable towards the other of said output and input shafts before said releasing and moving; and wherein said moving enables one of said output and input shafts to be axially moveable toward the other of said output and input shafts, thus permitting said transmission and said final speed reduction gear unit to be independently attached to and detached from said engine.

14. An intermediate shaft for connecting and extending in between an output shaft of a transmission and an input shaft of a speed reduction gear unit, said intermediate shaft having an external spline on one end for meshing engagement with an internal spline on one shaft of said output and input shafts;
an internal spline on the other end for meshing engagement with an external spline on the other shaft of said output and input shafts;
a first annular groove at said other end allowing expansion of a resilient split ring from a second annular groove in said other shaft;
wherein said intermediate shaft is capable of sliding axially into said one shaft when said resilient split ring is contracted back into said second annular ring; and
wherein said sliding opens an axial gap from said other shaft to said one shaft and said intermediate shaft, said gap being large enough to permit sufficient axial movement of at least one of said output or input shafts into said gap to permit said at least one to be independently attached to and detached from a vehicle engine.

15. The intermediate shaft of claim 14 wherein a surface at an end of said intermediate shaft can abut an end face of and thereby prevent axial movement of one of said output and input shafts.

16. The intermediate shaft of claim 15 wherein said surface is flat and solid across said end face and wherein said surface and said end face are transverse to an axis of said intermediate shaft.

* * * * *

UNITED STATES PATENT AND TRADEMARK OFFICE
CERTIFICATE OF CORRECTION

PATENT NO. : 5,062,822

DATED : November 5, 1991

INVENTOR(S) : Nakayama et al

It is certified that error appears in the above-identified patent and that said Letters Patent is hereby corrected as shown below:

THE ABSTRACT cond paragraph, line 8, after "axially" add --aligned--.

Signed and Sealed this

Sixteenth Day of November, 1993

Attest:

BRUCE LEHMAN

*Attesting Officer*  *Commissioner of Patents and Trademarks*